(12) United States Patent
Cox-Gutierrez et al.

(10) Patent No.: US 10,182,534 B1
(45) Date of Patent: Jan. 22, 2019

(54) FLUID TREATMENT DEVICE AND METHODS OF USE

(71) Applicants: Faye Cox-Gutierrez, Pritchett, CO (US); James H. Downing, Jr., Louisa, VA (US); Faye Cox-Gutierrez

(72) Inventors: Faye Cox-Gutierrez, Pritchett, CO (US); Anthony Jay Gutierrez, Pritchett, CO (US); James H. Downing, Jr., Louisa, VA (US)

( * ) Notice: Subject to any disclaimer, the term of this patent is extended or adjusted under 35 U.S.C. 154(b) by 407 days.

(21) Appl. No.: 15/058,185

(22) Filed: Mar. 2, 2016

Related U.S. Application Data

(60) Provisional application No. 62/126,741, filed on Mar. 2, 2015.

(51) Int. Cl.
| | |
|---|---|
| *C02F 1/36* | (2006.01) |
| *A01G 25/00* | (2006.01) |
| *C02F 1/30* | (2006.01) |
| *C02F 101/10* | (2006.01) |

(52) U.S. Cl.
CPC ............ *A01G 25/00* (2013.01); *C02F 1/30* (2013.01); *C02F 2101/10* (2013.01)

(58) Field of Classification Search
CPC ... A01G 25/00; C02F 1/36; C02F 1/10; C02F 1/48; C02F 1/005; C02F 1/481; C02F 5/00; C02F 2303/22; C02F 2305/08; B82Y 30/00; H01F 7/0294
See application file for complete search history.

(56) References Cited

U.S. PATENT DOCUMENTS

| | | | | |
|---|---|---|---|---|
| 2,976,422 A | * | 3/1961 | Hill | B01J 19/081 204/157.15 |
| 3,072,548 A | * | 1/1963 | Lucchesi | B01J 19/081 204/157.15 |
| 4,233,126 A | * | 11/1980 | Garcia | B01J 19/081 204/157.44 |

* cited by examiner

*Primary Examiner* — Walter D. Griffin
*Assistant Examiner* — Cameron J Allen

(57) ABSTRACT

Embodiments of a fluid treatment device and methods of use are described. Device embodiments typically include a barrel including a cavity with deflectors contained therein, and an energy chamber proximate the barrel. The energy chamber contains radionuclides such as, but not limited to U-238, U-235, and Th-232. Methods of use of fluid treatment device embodiments include treating water by passing the water through the barrel cavity and irrigating plants with the treated water. The water typically takes a circuitous path through the cavity because the deflectors obstruct a straight path through the cavity. Method of use examples include delivering the treated water by use of center-pivot irrigation. Plants irrigated with treated water typically require less water and produce greater yields than irrigated plants that receive no treated water.

16 Claims, 4 Drawing Sheets

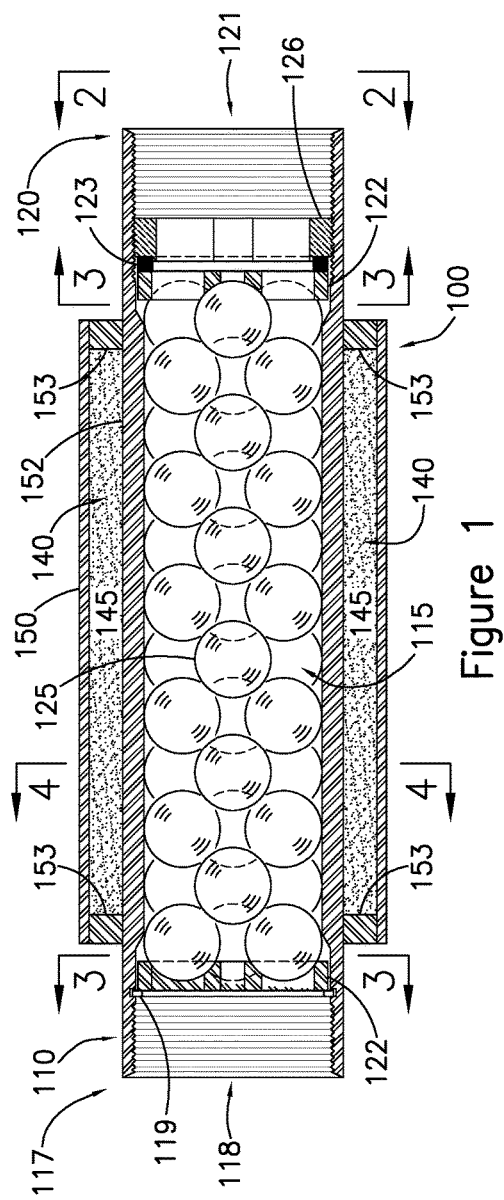
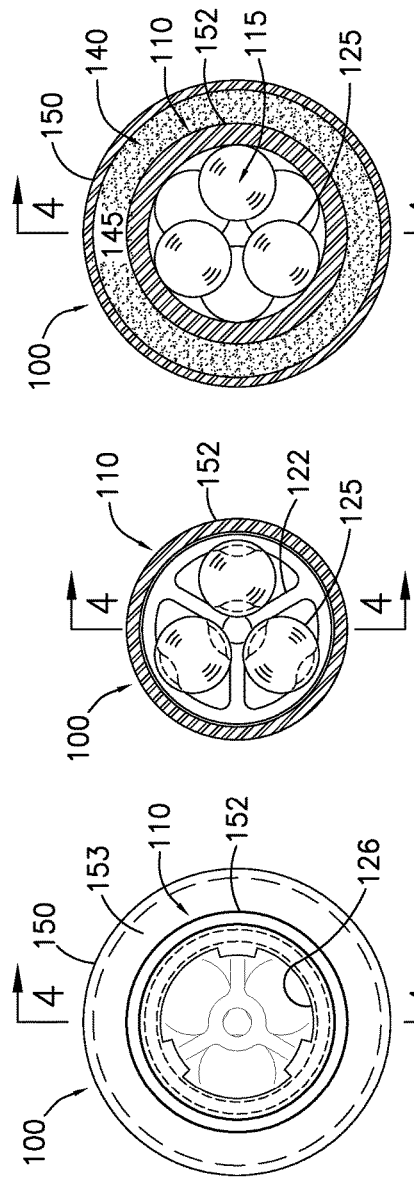
Figure 1
Figure 2
Figure 3
Figure 4

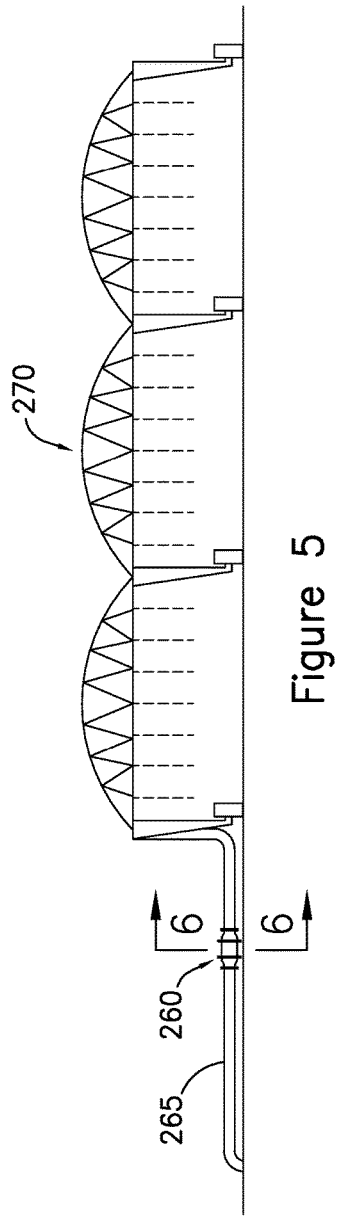
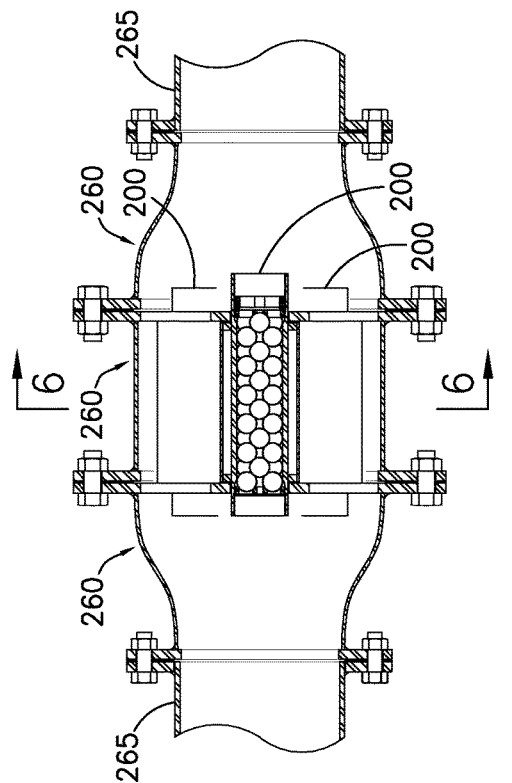
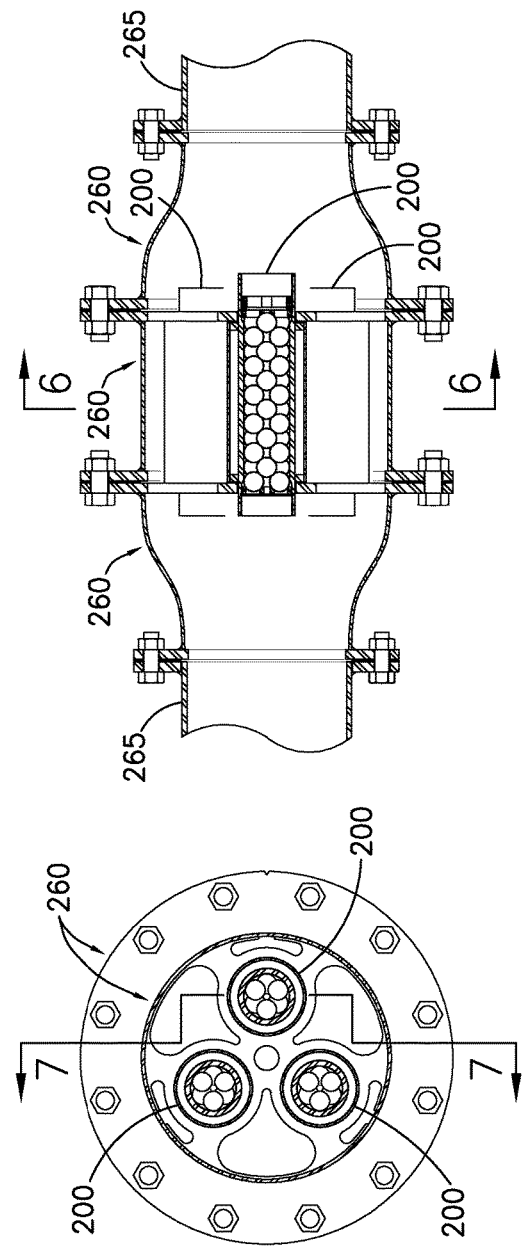

FLUID TREATMENT DEVICE AND METHODS OF USE

RELATED APPLICATION

The present application claims priority to and incorporates by reference, U.S. provisional application No. 62/126,741, filed Mar. 2, 2015, titled Water Treatment Apparatus.

BACKGROUND

Crops frequently require irrigation, supplemental fertilizer, and pesticides, each of which introduces complications in addition to solving problems. For example, irrigation requires a dependable water supply, and such supplies are becoming less accessible. In some areas, aquifers continue to be depleted by excess pumping, and from persistent drought, which requires increased irrigation and results in inadequate replenishment of the aquifers. Moreover, irrigated land is susceptible to becoming too saline for optimal plant growth, and can eventually become unsuitable for many plants. High soil salinity and reduced water available for irrigation can be especially problematic for irrigated land not subject to periodic flooding.

Use of fertilizers, for instance ammonium salts, can contribute to high soil salinity, and pesticides can also introduce additional salt to the soil. Moreover, fertilizer and pesticide use can pollute surface water through contaminated runoff that drains from fertilizer and pesticide treated crops. Accordingly, crop treatment that reduces demand for irrigation water, and also reduces introduction of salts, fertilizers, and pesticides, while enhancing crop yields and contributing to healthy soil, is needed.

BRIEF DESCRIPTION OF THE DRAWINGS

FIG. 1 is a longitudinal cross-section view of an embodiment of a fluid treatment device according to an embodiment.

FIG. 2 is an end view of a fluid treatment device according to an embodiment.

FIG. 3 is a transverse cross section view of an embodiment of a fluid treatment device according to an embodiment.

FIG. 4 is a transverse cross-section view of an embodiment of a fluid treatment device according to an embodiment.

FIG. 5 is a schematic view of an embodiment of a fluid treatment device plumbed to an irrigation system according to an embodiment.

FIG. 6 is a transverse cross-section view of a containment structure containing multiple fluid treatment devices according to an embodiment.

FIG. 7 is a longitudinal cross-section view of a containment structure containing multiple fluid treatment devices according to an embodiment.

DETAILED DESCRIPTION

Figure 8:
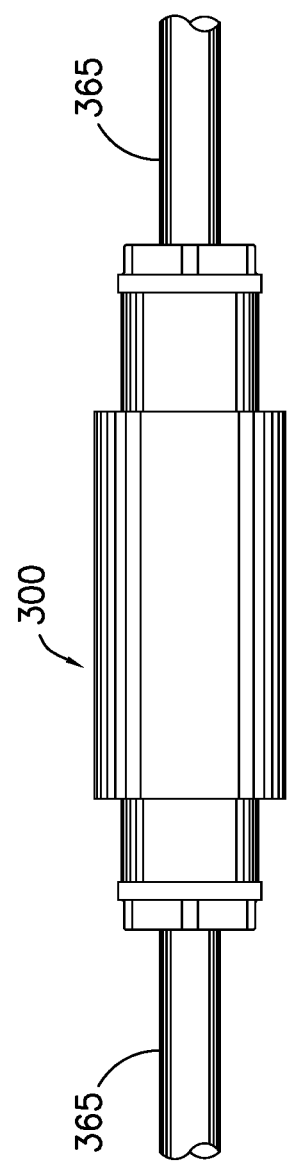
FIG. 8 is a side view of a fluid treatment device according to an embodiment.

Embodiments of a fluid treatment device according to the present invention include an apparatus configured to direct fluid along a circuitous path in close proximity to a radionuclide emitting very low dose ionizing radiation. The fluid typically, but not necessarily, comprises water. The device typically includes a barrel within which resides a cavity configured to receive a flow of fluid there through. The cavity is typically proximate an energy chamber containing radionuclides. The radionuclides typically emit ionizing radiation in an amount greater than or equal to 5.0 milliroentgens per hour (mR/hr) and less than or equal to 100 mR/hr. Some of the radioactivity emitted by the radionuclides is blocked from escaping the energy chamber.

The cavity typically contains deflectors configured to direct fluid flowing through the cavity along circuitous paths. The deflectors are typically, but not necessarily, spherical, and may include, but are not limited to, glass balls, stones, or ball bearings. In some embodiments, where the fluid is a liquid, the deflectors may induce cavitation in the liquid.

Crops irrigated with water treated by use of embodiments of the water fluid treatment device (which can be referred to as "treated water") typically show increased yields compared to irrigated crops that receive no treated water. In some circumstances, crops irrigated with treated water but not given fertilizer or pesticides show increased yield compared to irrigated crops treated with fertilizer and pesticide, but which receive no treated water. The yield enhancing benefit of irrigating with treated water does not require treatment of all irrigation water used on a crop, but can be realized through treatment of only a fraction of water used to irrigate a crop.

Mechanisms of action by which the fluid treatment device modifies irrigation water to the benefit of crops and soil are unknown. Anecdotal evidence indicates that soil irrigated with treated water according to the present invention can retain moisture more effectively than soil that is irrigated solely by conventional means.

It is thought that ionizing radiation from the fluid treatment device may generate hydroxyl radicals through radiolysis of water, with the reactive radicals oxidizing organic compounds that contaminate the water and can be detrimental to soil health. It is further hypothesized that cavitation induced in water as the water flows through the device may create additional reactive oxygen species, included but not limited to singlet oxygen ($^1\Delta_g O_2$ and $^1\Sigma_g O_2$). The additional reactive oxygen species may also participate in redox reactions with contaminants. Detrimental effects of the contaminants on plants, soil, and surface water may be reduced through reactive oxygen species mediated oxidation of the contaminants.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase. All definitions, as defined and used herein, should be understood to control over dictionary definitions, definitions in documents incorporated by reference, and/or ordinary meanings of the defined terms.

The phrase "and/or," as used herein in the specification and in the claims, should be understood to mean "either or both" of the elements so conjoined, i.e. elements conjunctively present in some cases and disjunctively present in other cases. Multiple elements listed with "and/or" should be construed in the same fashion, i.e. "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with inclusive language such as "comprising" can refer, in one embodiment to A only (optionally including elements other than B); in another embodiment to B only (optionally including elements other than B); in yet another embodiment to both A and B (optionally including other elements); etc.

The term "or" as used in this specification and the appended claims should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e., one or the other but not both) when preceded by terms of exclusivity, such as "either," "one of," "only one of," or "exactly one of." Consisting essentially of," when used in the claims, shall have its ordinary meaning as used in the field of patent law.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combination of elements in the list of elements. This definition also allows that elements may optionally be present other than the elements specifically identified within the list of elements to which the phrase "at least one" refers, whether related or unrelated to those elements specifically identified.

The indefinite articles "a" and "an," as used herein in the specification and in the claims, unless clearly indicated to the contrary, should be understood to mean "at least one."

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the numeric value provided.

The term "about," as used in this specification and appended claims, refers to plus or minus 20% of the value given.

The term "generally" as used in this specification and appended claims, mean mostly, or for the most part.

The terms "removable", "removably coupled", "removably installed", "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

Directional or relational terms such as "top," bottom," "front," "back," "above," "beneath," and "below," as used in this specification and appended claims, refer to relative positions of identified elements, components, or objects, where the components or objects are oriented in an upright position as normally installed or used.

A First Embodiment Fluid Treatment Device

A first embodiment fluid treatment device 100 is illustrated in FIGS. 1-4. The first embodiment device 100 includes a barrel 110 having a cavity 115 within which reside deflectors 125. The barrel 110 of the first embodiment is typically cylindrical and includes a first end 117 and a second end 120. The first embodiment cavity 115 is also cylindrical. In some embodiments, the barrel is not cylindrical and in some embodiments the cavity is not cylindrical.

The deflectors 125 of the first embodiment device are grade 100 borosilicate spherical solid glass balls having a diameter of approximately 1.0 inch. Other embodiments comprise deflectors including, but not limited to, glass objects, metal objects, and stone objects. Variations of deflectors are typically, but not necessarily, spherical. Deflectors 125 residing at each end of the cavity 115 are confined within the cavity 115 by deflector saddles 122. The deflector saddle 122 residing proximate the barrel first end 117 is held in place by internal retaining rings 119. The deflector saddle 122 residing proximate the barrel second end 120 is retained by a spanner nut 126 and a square O-ring 123.

The deflectors 125 are configured to partially obstruct, and hence deflect, fluid that flows through the cavity 115 across a pressure gradient from one to the other of the barrel first end 117 and the barrel second end 120. The barrel 110 includes a first end orifice 118 and a second end orifice 121, each of which is configured to receive fluid flowing into the barrel 110 en route to the cavity 115, or out of the cavity and subsequently out of the barrel. The first and second orifices are each in fluid communication with the cavity. Fluid flowing through the cavity 115 generally takes a circuitous path around the deflectors 125. In some embodiments, the deflectors induce cavitation in water flowing through the device.

The first embodiment fluid treatment device 100 further includes an energy chamber 140 within which resides a radionuclide mixture 145. The energy chamber 140 is bounded on the outside by a jacket 150 surrounding part of the barrel 110. A wall of the barrel 110 bounds the energy chamber 140 on the inside and acts as a physical barrier 152 separating the energy chamber 140 from the cavity 115. The jacket 150 and the physical barrier 152 of the first embodiment typically comprise type 304 stainless steel. In other embodiments the jacket and physical barrier comprise materials including, but not limited to, metals and metal alloys, polymeric compositions (such as, but not limited to polyvinyl chloride), and composites. The composites can include fibers embedded in resin, such as but not limited to, fiberglass or carbon fibers in an epoxy based resin.

The first embodiment cavity 115 typically has an inside diameter of approximately 2.32 inches, an outside diameter of approximately 2.88 inches, and a length of approximately 8.31 inches. A wall of the barrel, which forms the physical barrier 152 between the cavity 115 and the energy chamber 140, is typically approximately 0.28 inch thick.

The jacket 150 of the first embodiment comprises a cylindrical sleeve approximately 8.13 inches long, with an inside diameter of approximately 3.75 inches and an outside diameter of approximately 4.0 inches. The barrel 110 resides centered within the jacket 150, and the energy chamber 140 resides in a space between the jacket and the barrel. Ends of the jacket 150 are coupled to the barrel 110 with plugs 153, which also serve to close ends of the energy chamber 140. In the first embodiment device, the energy chamber 140 (i.e. the space between the jacket 150 and the physical barrier 152 of the barrel 110) is approximately 0.44 inch thick, and has a volume of about 537 mL. The plugs 153 typically, but not necessarily, comprise polyurethane, and are pressed into place. In some embodiments the plugs comprise steel or other metal or metal alloy. Plug embodiments comprising metal or metal alloys may be welded in place. Embodiments in which the plugs are affixed with adhesive are contemplated. The energy chamber is sealed to secure the radionuclide mixture within, and to prevent fluid exchange, for example air or water, between inside the energy chamber and outside the energy chamber.

The dimensions disclosed for the first embodiment fluid treatment device 100 are merely exemplary. Other embodiments include barrels, cavities, and energy chambers having dimensions and materials that differ from those of the first embodiment device 100.

The radionuclide mixture 145 of the first embodiment comprises uranium, including uranium-238 (U-238) and uranium-235 (U-235), and their decay products, along with non-radioactive material. At least some of the U-238 and U-235 is typically in the form of $U_3O_8$ and $UO_2$. The first embodiment radionuclide mixture typically includes uraninite, carnotite, copper, and bentonite. Some embodiments include various metal salts, such as but not limited to, chloride and sulfate salts of sodium, calcium, potassium, and magnesium.

In some embodiments, the radionuclide mixture includes one or more of U-238, U-235, or thorium-232 (Th-232). Various embodiments may also include decay products of U-238, U-235, or Th-232. Some embodiments comprise other uranium compositions, including but not limited to uranium silicates or uranium hydroxides.

Non-radioactive material in radionuclide mixture of the first embodiment typically includes copper. The copper typically, but not necessarily, is in the form of a hydrated copper silicate or copper hydroxide ($CuOH_2$). The hydrated copper silicate may have the empirical formula $(Cu_{1.75}Al_{0.25}H_{1.75}(Si_2O_5)(OH)_4 \cdot 0.25(H_2O))$, and may be in the form of naturally occurring chrysocolla.

Some radioactivity emitted by the radionuclide mixture is typically blocked by the jacket 150 and physical barrier 152, such that a fraction of the radioactivity emitted by the radionuclide mixture reaches the cavity. For example, the radionuclide mixture of the first embodiment typically emits alpha particles, beta particles, and gamma rays. However, the alpha and beta particles are typically blocked by the jacket 150 and the physical barrier 152, such that alpha particles and beta particles are not detected in the cavity 115 or outside the device 100.

In some embodiments, x-rays as well as gamma rays are emitted into the cavity 115 and outside the device 100. It is thought the x-rays include bremsstrahlung produced by interaction of beta particles and metal nuclei residing in the radionuclide mixture. Where embodiments of the fluid treatment device include metal or metal alloys, including the stainless steel of the first embodiment device 100, bremsstrahlung may result from interaction of beta particles with metal nuclei in the steel.

Radiation detected in the cavity 115 or proximate the jacket 150 (within about an inch of the jacket) outside the device 100 typically falls in a range of 0.10 mR/hr to 2.0 mR/hr. Radiation is measured using an "Inspector Alert™" radiation detector (from IMI, Sebastopol, Calif.), or other geiger-muller tube based counter, with the detector output set to milliroentgens per hour (mR/hr) For purposes of the present invention, 1.0 milliroentgens (mR) radiation can be considered equivalent to a radiation dose of 0.93 millirems (mrem). Thus radioactivity of 1.0 mR per hour (mR/hr) is considered equivalent to 0.93 mrem/hr. For purposes of the present invention, x-rays are defined as electromagnetic radiation having a wavelength in a range of 120 picometers (pm) to 10 pm. Radiation of this wavelength is sometimes referred to as hard x-rays. The Inspector Alert™ radiation detector generally does not detect photons having an energy less than 10 keV (approximately 120 pm). For the purposes of the present invention, gamma rays are defined as having a wavelength less than 10 pm.

The radionuclide mixture 145 of the first embodiment fluid treatment device 100 is typically prepared and loaded into the energy chamber 140 as follows. An aliquot of a uraninite\carnotite mixture emitting radioactivity of 10-15 mR/hr is mixed with a sufficient quantity of chrysocolla and bentonite to bring a total volume of the loosely packed, dry mixture to about 900 mL (about 3.80 cups). Before loading, a typical radionuclide mixture comprises is about 30%-50% uraninite/carnotite by volume, about 25%-45% chrysocolla by volume, and about 20% bentonite by volume. An additional small quantity of the uraninite/carnotite mixture may be required to adjust radioactivity of the radionuclide mixture to emit 10-15 mR/hr. The radionuclide mixture can be mixed to approximate homogeneity by hand or by use of a power mixer (for example an electric mixer). This recipe is scalable, and liter to kiloliter or larger batches of radionuclide mixture can be prepared using commercial scale mixers.

The radionuclide mixture 145 is typically loaded into the energy chamber 140, which is sealed at one end and open at the other end to facilitate loading. Typically, about 200-250 mL of the radionuclide mixture is added to the energy chamber and pressed at about 25,000 psi to achieve a dense dry mixture in the chamber 140. This process is repeated until the energy chamber is full, at which point the open end is sealed by installing a plug 153. Despite variation in radioactivity of the uraninite/carnotite mixture and relatively large variability in mass per volume of loosely packed dry compositions, the above volumetric measuring method, together with subsequent high pressure packing, consistently results in a about 900 mL of radionuclide mixture having radioactivity of approximately 10-15 mR/hr, with most of the radionuclide mixture being packed into the energy chamber. About 100-250 mL of radionuclide mixture typically remain unloaded after filling and sealing the energy chamber. Accordingly, the energy chamber typically contains a radionuclide mixture having radioactivity in a range of 7.2 to 13.3 mR/hr. In some embodiments the energy chamber contains a radionuclide mixture having up to 100 mR/hr activity.

The above process for loading the energy chamber is merely exemplary and other processes may prove adequate. In some variations, the energy chamber is loaded with radionuclide mixture without use of a press, particularly where a fluid treatment device embodiment includes parts poorly adapted to withstand high pressures. Some embodiments include using about 500 psi to compact the radionuclide mixture in the energy chamber. Pressures of 500 to 5000 psi and 5000 to 25000 psi are used in some embodiments. For the first embodiment fluid treatment device 100, which comprises a stainless steel barrel 110 and sleeve 150, the energy chamber readily withstands 25,000 psi packing pressure, and the result is a compact and efficient device.

A Second Embodiment Fluid Treatment Device

Second embodiment fluid treatment devices 200 are shown in FIGS. 6-7. Like the first embodiment, each of the second embodiment devices 200 includes a barrel surrounding a cavity configured to receive a flow of water. The cavity contains deflectors configured to deflect water flowing through the cavity.

As best seen in FIGS. 5-7, the second embodiment fluid treatment devices 200 reside in a containment structure 260 plumbed to a water line 265 configured to deliver water to a center-pivot irrigator 270, which distributes the water and thus irrigates plants. In some embodiments, fluid treatment devices are used to treat water for irrigation by means other than center-pivot irrigation, including but not limited to flood irrigation and drip-line irrigation. Variations of irrigation with treated water can include delivering water to soil proximate a plant (for example, within eight inches of the plant). Irrigation with treated water can also include watering lawns and irrigation of plants in greenhouses or indoor grow operations. In hydroponic applications, treated water may be delivered directly to plant roots.

For purposes of the present invention, the containment structure 260 can be considered to be part of the water line 265 to which it is plumbed, and fluid treatment devices 200 residing in the containment structure 260 can thus be considered to reside in the water line 265. The plants can include crops such as, but not limited to, alfalfa, hay, wheat, soybeans, and corn. As best seen in FIG. 7, the fluid treatment devices 200 can be anchored in the containment structure 260 by securing means that are integral with the containment structure. Irrigation water is typically delivered to the center-pivot irrigator at about 500 to 1200 gallons per minute.

A portion of the water flows through each of the fluid treatment devices 200, where the water takes a circuitous route through the cavity, being deflected by the deflectors as it flows. The water is irradiated with very low dose radiation as it flows through the cavity, and cavitation in the water may ensue as the water flows around the deflectors. Another portion of the water flows around the devices 200, but inside the containment structure, where it may also be irradiated by very low dose radiation. The very low dose radiation that emanates from the energy chamber typically comprises gamma rays and x-rays.

In some embodiments, a fluid treatment device, water line, containment structure, and irrigator can be collectively referred to as a fluid treatment system.

Fluid treatment systems typically comprise one or more fluid treatment devices plumbed to a water line, or installed in a containment structure plumbed to a water line. FIG. 8 illustrates a third embodiment fluid treatment device 300 plumbed directly to a water line 365, rather than installed in containment structure.

Embodiments of multiple fluid treatment devices can be arranged in series or in parallel. Where the multiple fluid treatment devices are used in one containment structure or water line, for example as illustrated in FIGS. 5-7, the multiple apparatuses are typically not operationally coupled to each other such that water exiting one of the multiple devices will necessarily enter another of the multiple devices.

In some embodiments, a portion of the water exiting a fluid treatment device may enter another fluid treatment device, and another portion of the water exiting the fluid treatment device may flow around the other fluid treatment device. Similarly, some of the water that flows around a fluid treatment device may enter another fluid treatment device, and some may flow through the other fluid treatment device.

A Method of Using a Fluid Treatment Device

Figure 9:
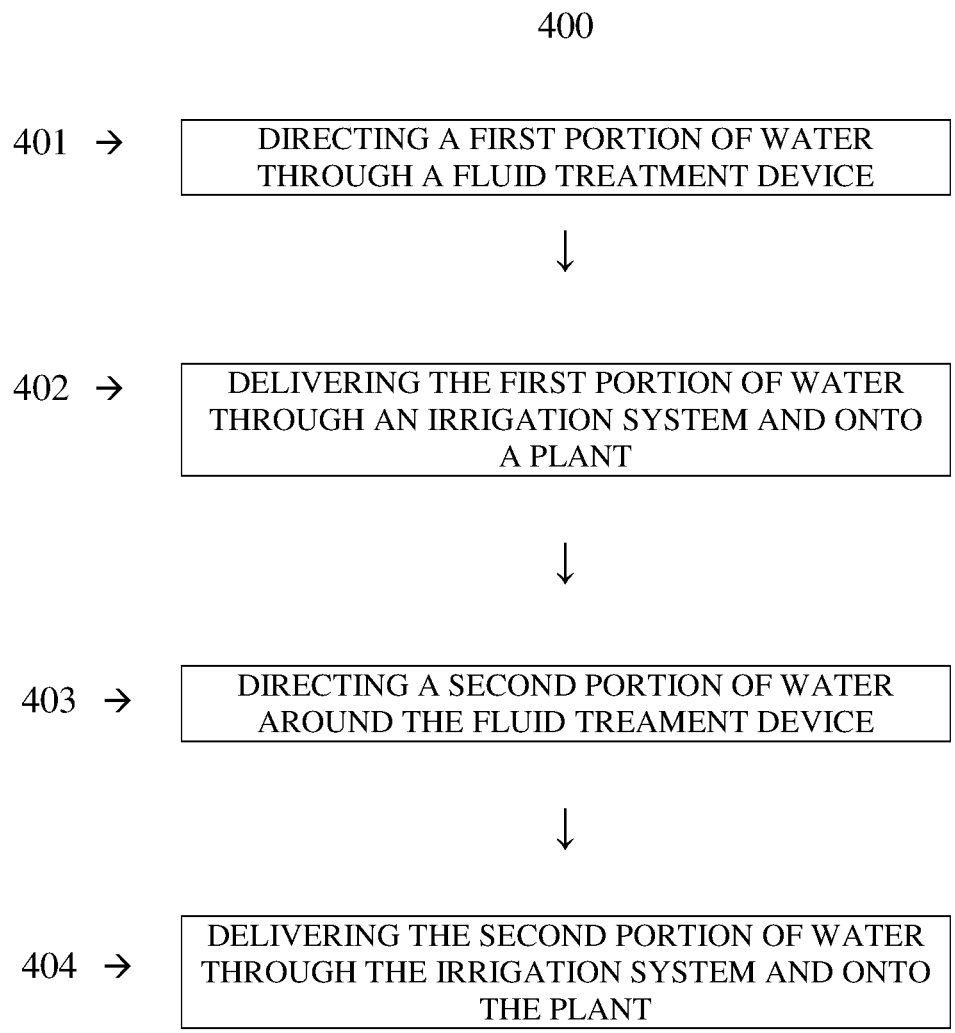
FIG. 9 is a flow chart of a method of using a fluid treatment device according to an embodiment.

A method of using a fluid treatment device 400 to irrigate a plant with treated water is depicted in FIG. 9. A first operation 401 of the method includes directing a first portion of water through the fluid treatment device. The fluid treatment device is typically plumbed into a water line configured to deliver water to the plant through an irrigation system, as illustrated in FIGS. 5-8. The first portion of the water flows through the fluid treatment device, where the water takes a circuitous route through the cavity, being deflected by the deflectors as it flows. The water is irradiated with very low dose radiation as it flows through the cavity, and cavitation in the water may ensue as the water flows around the deflectors. Very low dose radiation is between 0.05 and 100 mR/hr.

A second operation 402 of the method 400 includes delivering the first portion of water through the irrigation system to the plant. The irrigation system can include a center-pivot irrigator, as illustrated in FIG. 5. The plant is frequently, but not necessarily, alfalfa. Other plants include, but are not limited to, wheat, grass, soybeans, corn, sorghum, rice, barley cotton, other crops, vegetables, and orchards.

A third operation 403 includes directing a second portion of the water around the device. Some of the second portion of the water may be, but is not necessarily, irradiated by very low dose radiation as it flows around the device. As best seen in FIG. 7, the water that flows around the fluid treatment device may still be contained within a containment structure plumbed to the water line.

A fourth operation 404 of the method 400 includes delivering the second portion of water through the irrigation system to the plant. The first and second portions of water typically comprise 500-1200 gallons of water, which is delivered to the plant through the center-pivot irrigator.

The first operation 401 and the third operation 403 typically occur concurrently with each other, i.e. water typically flows simultaneously both through and around the fluid treatment device. Similarly, the second operation 402 typically occurs simultaneously with the fourth operation 404, i.e. the first portion of water is typically delivered through the irrigation system at the same time the second portion of water is delivered. Moreover, all of the first, second, third, and fourth operations may also be performed simultaneously.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

Examples of variations in methods of using embodiments of a fluid treatment device include treatment of water in desalination operations, or for drinking by humans, pets, or livestock.

We claim:

1. A fluid treatment device comprising:
a barrel having a first end, a second end, and a cavity disposed within the barrel;
a first orifice disposed at the first end, the first orifice being in fluid communication with the cavity;
a second orifice disposed at the second end, the second orifice being in fluid communication with the cavity;
an energy chamber coupled to the barrel and separated from the cavity by a physical barrier;
a radionuclide mixture residing within the energy chamber, the radionuclide mixture emitting one or more types of ionizing radiation selected from the group consisting of alpha particles, beta particles, x-rays, and gamma rays; and
deflectors residing within the cavity, the deflectors being configured to deflect fluid flow in the cavity;
wherein:
the radionuclide mixture includes uranium; and
the deflectors include glass balls.

2. A fluid treatment device comprising:
a barrel having a first end, a second end, and a cavity disposed within the barrel;
a first orifice disposed at the first end, the first orifice being in fluid communication with the cavity;
a second orifice disposed at the second end, the second orifice being in fluid communication with the cavity;
an energy chamber coupled to the barrel and separated from the cavity by a physical barrier;
a radionuclide mixture residing within the energy chamber, the radionuclide mixture emitting one or more types of ionizing radiation selected from the group consisting of alpha particles, beta particles, x-rays, and gamma rays; and
deflectors residing within the cavity, the deflectors being configured to deflect fluid flow in the cavity;
wherein the radionuclide mixture includes uranium and copper.

3. The device of claim 2, wherein the radionuclide mixture includes uraninite.

4. The device of claim 3, wherein the radionuclide mixture includes hydrated copper silicate.

5. The device of claim 3, wherein the radionuclide mixture includes chrysocolla.

6. A fluid treatment device comprising:
a barrel having a first end, a second end, and a cavity disposed within the barrel;
a first orifice disposed at the first end, the first orifice being in fluid communication with the cavity;
a second orifice disposed at the second end, the second orifice being in fluid communication with the cavity;
an energy chamber coupled to the barrel and separated from the cavity by a physical barrier;
a radionuclide mixture residing within the energy chamber, the radionuclide mixture emitting one or more types of ionizing radiation selected from the group consisting of alpha particles, beta particles, x-rays, and gamma rays, wherein the radionuclide mixture emits ionizing radiation in a range of 0.05 to 100 milliroentgens per hour (mR/hr).

7. A method of irrigating a plant using a fluid treatment device, the method comprising:
passing a first portion of water through the cavity of the fluid treatment device;
delivering the first portion of water to the plant by distributing the first portion of water on the crop or on soil in which the crop is planted;
wherein:
the fluid treatment device comprises:
a barrel having a first end, a second end, and a cavity disposed within the barrel;
a first orifice disposed at the first end, the first orifice being in fluid communication with the cavity;
a second orifice disposed at the second end, the second orifice being in fluid communication with the cavity;
an energy chamber coupled to the barrel and separated from the cavity by a physical barrier;
a radionuclide mixture residing within the energy chamber, the radionuclide mixture emitting one or more types of ionizing radiation selected from the group consisting of alpha particles, beta particles, x-rays, and gamma rays.

8. The method of claim 7, wherein said delivering the first portion of water to the plant includes distributing the first water with a center-pivot irrigator.

9. The method of claim 8, wherein the fluid treatment device resides in a water line through which the water is delivered to the center-pivot irrigator.

10. The method of claim 9, further comprising:
passing a second portion of water around the fluid treatment device and within the water line; and
delivering the second portion of water to the plant or to soil proximate the plant.

11. A fluid treatment device comprising:
an energy chamber;
a radionuclide mixture residing within the energy chamber, the radionuclide mixture emitting between 0.05 mR per hour and 100 mR per hour of ionizing radiation;
a cavity separated from the energy chamber by a physical barrier, wherein a fraction of the between 0.05 mR per hour and 100 mR per hour of ionizing radiation emitted by the radionuclide mixture enters the cavity from the energy chamber.

12. The fluid treatment device of claim 11, further comprising deflectors residing within the cavity, the deflectors being configured to partially obstruct the cavity.

13. The device of claim 12, wherein the radionuclide mixture includes uranium.

14. The device of claim 13, wherein the deflectors include glass balls.

15. The device of claim 13, wherein the deflectors are spherical.

16. The device of claim 12, wherein the radionuclide mixture further includes uraninite and hydrated copper silicate.

* * * * *